(12) United States Patent
Beik

(10) Patent No.: US 11,377,075 B2
(45) Date of Patent: Jul. 5, 2022

(54) ELECTRIFIED LANDING GEAR ADAPTOR

(71) Applicant: Omid Beik, Vaughan (CA)

(72) Inventor: Omid Beik, Vaughan (CA)

( * ) Notice: Subject to any disclaimer, the term of this patent is extended or adjusted under 35 U.S.C. 154(b) by 436 days.

(21) Appl. No.: 16/679,543

(22) Filed: Nov. 11, 2019

(65) Prior Publication Data

US 2020/0377062 A1 Dec. 3, 2020

Related U.S. Application Data

(60) Provisional application No. 62/856,384, filed on Jun. 3, 2019.

(51) Int. Cl.
*B60S 9/06* (2006.01)

(52) U.S. Cl.
CPC ..................... *B60S 9/06* (2013.01)

(58) Field of Classification Search
CPC ....................................................... B60S 9/06
See application file for complete search history.

(56) References Cited

U.S. PATENT DOCUMENTS

| 2011/0113563 | A1* | 5/2011 | Gabb | B60B 29/006 |
| | | | | 7/100 |
| 2015/0197127 | A1* | 7/2015 | Magestro | B60S 9/18 |
| | | | | 173/217 |
| 2019/0031157 | A1* | 1/2019 | Sun | B60S 9/04 |

* cited by examiner

*Primary Examiner* — Bryan A Evans

(74) *Attorney, Agent, or Firm* — Nasser Ashgriz; UIPatent Inc.

(57) ABSTRACT

The present invention is a universal adapter attachable to the landing gear shaft of a semi-truck trailer to replace the use of manual hand crank handle and facilitate automation of raising and lowering the landing gear. The automation may be electric powered using an electric impact wrench or pneumatic using an air powered impact wrench. The universal adapter significantly eliminates the issues using the existing hand-cranks handle such as back, shoulder, knee and hand injuries and reduce the operation time for raising and lowering a landing gear.

6 Claims, 11 Drawing Sheets

ELECTRIFIED LANDING GEAR ADAPTOR

FIELD OF THE INVENTION

The present invention relates generally to trucking industry, and especially to an adapter for automation of semi-truck trailer landing gear system.

BACKGROUND OF THE INVENTION

The invention is related to automation and electrification of semi-truck trailer landing gears system. Many semi-trucks that have trailers are equipped with landing gears, which support the front of the trailer during parking and storage of the trailer, and when changing trailers on the tractor. Most trailers have a set of landing gears with either pads or rollers mounted toward the front of the trailer.

Most existing landing gear systems use a hand-crank handle to lower or rise the landing gear legs, which could cause possible injuries on shoulder, back, hands and knees of the user. Further, this is a time-consuming process, which is particularly troublesome during inclement weather or after a long-distance drive. The crank handle has also disadvantages so that when is not in use, it is supposed to hang on a bracket on one of the landing gears. In many cases, the crank handle may hang loose or may fall off the trailer, creating a hazard to other vehicles and making trouble for the truck driver who later discovers that it is missing.

There have been some attempts to develop a non-manual landing gear operating device. Some trailers have hydraulic, air driven, or electric landing gear systems but they cannot be used with manual drills and require specific modifications to every trailer, therefore they incur costs to trucking companies. The existing automated pneumatic and hydraulic devices are also complicated with low efficiency, high weight and manufacturing and maintenance costs. For example, the electric tool offered by "UltraLift Technologies" disclosed in (U.S. Pat. No. 8,590,417B1) requires a custom designed and manufactured electric drive, which is expensive, unfit for mass manufacturing and heavy. The "Griffin Tool" disclosed in (US20150175136A1, US20110012333A) is tubed-shaped and requires significantly more manufacturing process, it is expensive, and it is used together with an air impact wrench and the air available from the truck. The available air in the truck is at low pressure, which makes it unoperatable for many of the landing gear systems as they require a significantly higher-pressure air flow, which this limits the application of "Griffin Tool".

The prior art also discloses a complex structure to receive pressurized air for the actuators to rotate the landing gear shaft to raise and lower the landing gear. Other means for the raising and lowering of landing gear are known in the prior art such as the use of hydraulic pistons or air cylinder receiving air from air brake line of the trailer. These devices are large and cumbersome, heavy, expensive in manufacturing and low efficiency in operation and do not provide the same positive holding and may result to collapse from the landing gear.

Powered lift mechanisms further disclosed in prior art for various types of landing gears have also the disadvantages in which the power drive requires special landing gear constructions which are complex in structure and expensive to manufacture. Because of the complexity, excessive weight, volume and expense of prior art systems for raising and lowering semi-truck-trailer landing gears, they have not been widely used in the trucks. Therefore, there is a need for a simple and inexpensive solution that can be used with any landing gear and can be operated with any impact drivers available in the market.

SUMMARY OF THE INVENTION

Semi-truck-trailers provide a landing gear to support the trailer on the ground for loading or unloading the trailer while the tractor vehicle is detached. These landing gears are generally two spaced apart, jack-type devices joined by a cross member. The cross member is a common drive shaft engaged with a gear box assembly on one end that is driven by a manually operated crank handle to raise or lower the landing gear. The trailer can be raised or lowered for connecting or disconnecting the trailer to or from the tractor vehicle.

The landing gears usually are operated by various means comprising of a landing gear shaft, a gear reduction assembly on the landing gear shaft, a drive shaft projecting from the gear reduction assembly. A crank handle is usually used for manually operating the drive shaft. The manual kind of landing gears which is the existing practice, are difficult to operate, require considerable time in their operation and could cause injuries.

The system of the present invention resides in automation and electrification of semi-truck trailer landing gear mechanisms for raising and lowering the trailer. The present invention is an inexpensive steel adapter attachable to any landing gear shaft to replace the use of manual hand crank handle with the use of an electric wrench. The electric wrench can be any off-the-shelf 0.5-inch impact electric drive, which are widely available in the market and are multipurpose.

For operation, the existing hand-crank handle is removed, and the adapter is installed by simply connecting the landing gear shaft to the adapter via bolts and nuts. The process significantly reduces the operation time and cost, while preventing injuries. In addition to electric drive the adapter can also be used with an air-powered impact wrench. The air impact wrench is connected to the tractor air supply using a glad hand and air hose. Thereby, the present invention facilitates a universal application for any landing gear with either air or electric power tool.

The adapter of the present invention is a metal frame with a plurality of cross bars which are laser cut, punched or notched and preferably welded in rectangular shape with a height varying from 1 inch to 5 inches or any desired height. The length of the adapter may vary from 2 inches to 20 inches or any length depending on the landing gear of the trailer. All parts are made of steel or its compounds to achieve a rigid and lightweight device. The device may be painted or coated as powder coat or e-coat or may also be plated.

The adapter provides plurality of apertures each adapted to receive various connecting means of the landing gear from one end (gear shaft end) and a square-shaped hole for connection of an electric or air driven impact wrench from its other end (wrench end). The square hole may be varying at any size to receive the wrench shaft. The apertures sizes may vary depending on the thickness of the steel used in welding process. The unique design of the adapter allows for modified manufacturing in a very low-cost manner.

The present invention is a universal adapter to be used with any landing gear. The unique shape of the adapter further enables the device to be used manually with a hand-crank in case the other devices are not available.

Therefore, it is an object of the present invention to provide a device for automating and replacing the manual hand-crank handle for semi-truck trailer landing gear, which is extremely simple to install, is compact and is low cost in production.

It is another object of the present invention to reduce the risk of injuries and discomfort and health for the drivers.

It is another object of the present invention to significantly reduce the raising time of the landing gear which is manually 3 to 5 minutes to less than 20 seconds, which is beneficial for the drivers especially in cold and hot weather to prevent the driver to be exposed to extreme conditions for a long time.

It is another object of the present invention to provide a universal adapter which can be used with off-the-shelf electric impact wrench, an air impact wrench or manually by a hand-crank.

BRIEF DESCRIPTION OF THE DRAWINGS

Embodiments hereinafter will be described in conjunction with the appended drawings provided to illustrate and not to limit the scope of the claims, wherein like designations denote like elements, and in which:

DETAILED DESCRIPTION OF PREFERRED EMBODIMENTS

Figure 1:
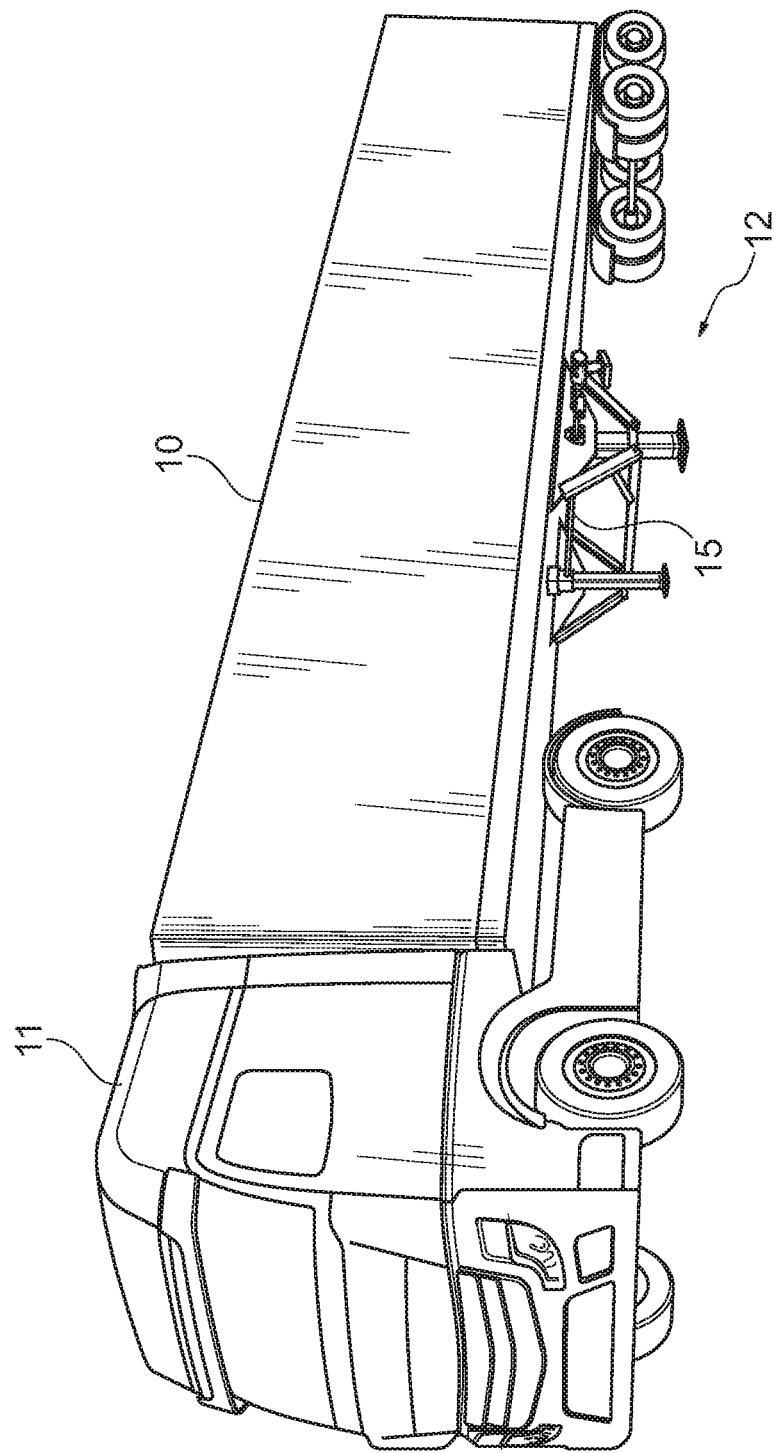
FIG. 1 is a perspective view illustrating a trailer hitched thereto and showing the landing gear and the adapter of the present invention installed and connected to an electric wrench thereon.
Figure 2A:
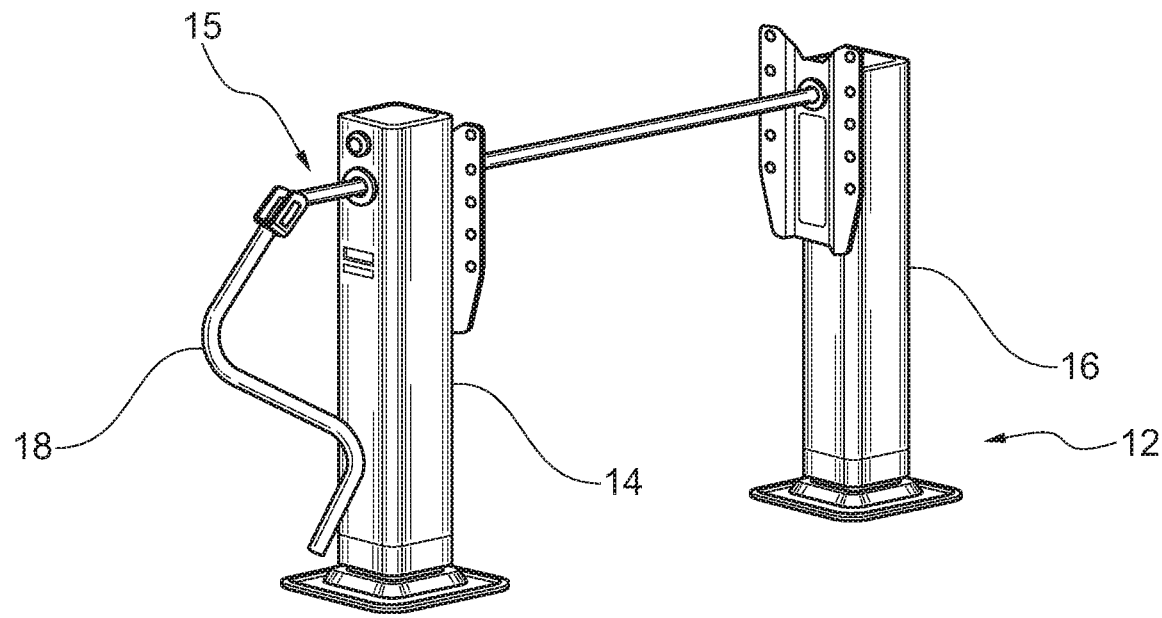
FIG. 2A is an enlarged view of a landing gear showing the parts and a hand crank handle to manually raise and lower a trailer.
Figure 2B:
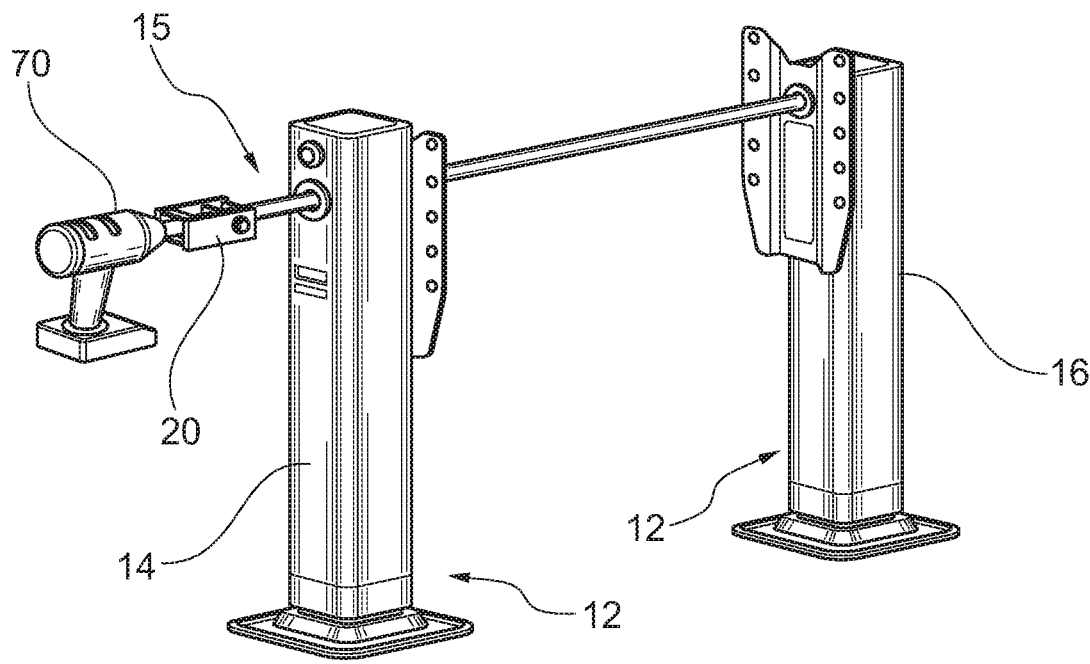
FIG. 2B is an enlarged view of a landing gear showing the parts and the present invention mounted on the landing gear shaft and driven by an electric wrench.

According to FIGS. 1 and 2 a trailer 10 is shown which is connected to a tractor 11 at the front end of the trailer 10. An alternately extendable and retractable landing gear 12 is mounted under the semi-trailer 10. The landing gear 12 comprises of a pair of telescopic legs 14 and 16 secured respectively to the frame structure of the trailer 10. The legs 14 and 16 retracted upwardly when the trailer 10 is coupled to the tractor 11 so as to prevent the legs from contacting the ground during towing of the trailer 10. When the trailer 10 is to be uncoupled from the tractor 11, the legs are extended downwardly to jack the trailer upwardly off of the "fifth wheel" of the tractor and to enable the trailer to stand alone.

FIG. 2 shows the existing manual hand-crank. A landing gear shaft 15 rotatable extends laterally between the upper end of the legs 14 and 16 and is effective to extend the legs when rotated in one direction and to retract the legs when rotated in the opposite direction. Various types of mechanisms well known in the art may act with the shaft to cause the legs to extend or retract when the shaft 15 is rotated. The Landing gear shaft 15 has an extending outwardly portion on one end which in many trailers a hand crank 18 is attached thereto to be manually turned to rotate the shaft 15 and extend and retract the legs 14 and 16. To avoid the time and effort required to manually operate the crank 18, the present invention is provided for automation and electrification the semi-truck trailer landing gear mechanisms for raising and lowering the trailer.

The present invention is an adapter, which replaces the existing manual hand-crank handle 18 for the semi-truck trailer landing gear 12 which is attached on the landing gear shaft 15. The adapter 20 may be installed in an accessible location on a protruding portion of the landing gear shaft close to one of the legs 14 or 16.

For installation of the adapter 20 the existing hand-crank handle 18 is removed, and the adapter 20 is installed by simply connecting the landing gear shaft 15 to the adapter 20 via a bolt and nuts. Once the adapter is installed an electric impact wrench is used to turn the adapter 20 and hence raise or lower the landing gear 12. In one application the wrench is off-the shelf general purpose 0.5-inch electric impact wrench. Therefore, the process is automated preventing injuries while significantly reducing the operation time and cost. The adapter can also be used with an air impact wrench. The air impact wrench is connected to the tractor air supply using a glad hand and air hose. Therefore, the adapter 20 facilitates a universal application for any landing gear with either air or electric power tool.

Figure 3:
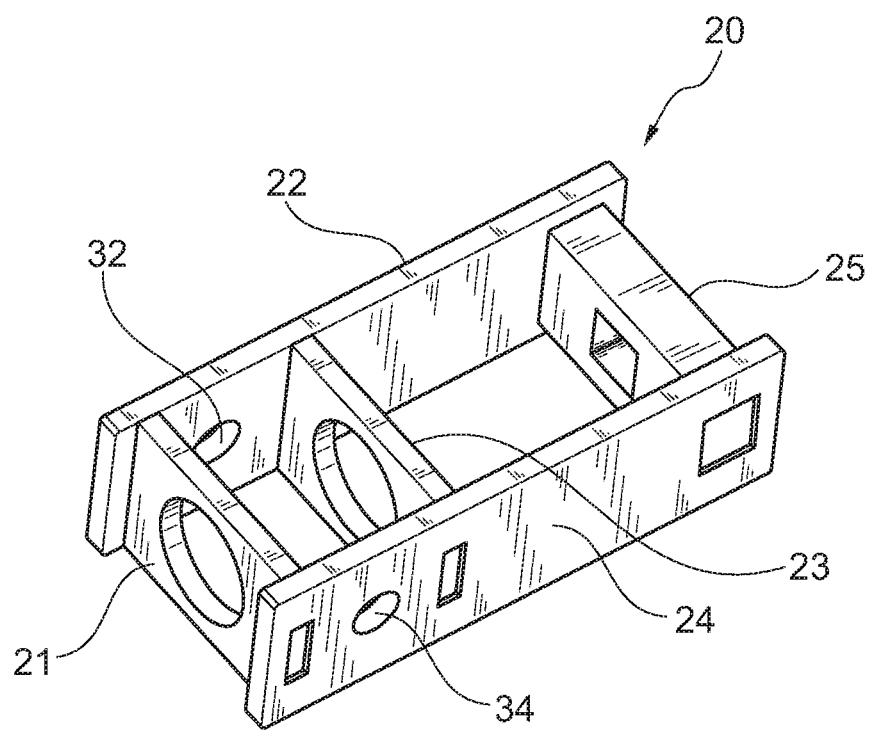
FIG. 3 is a perspective view of the present invention.
Figure 4:
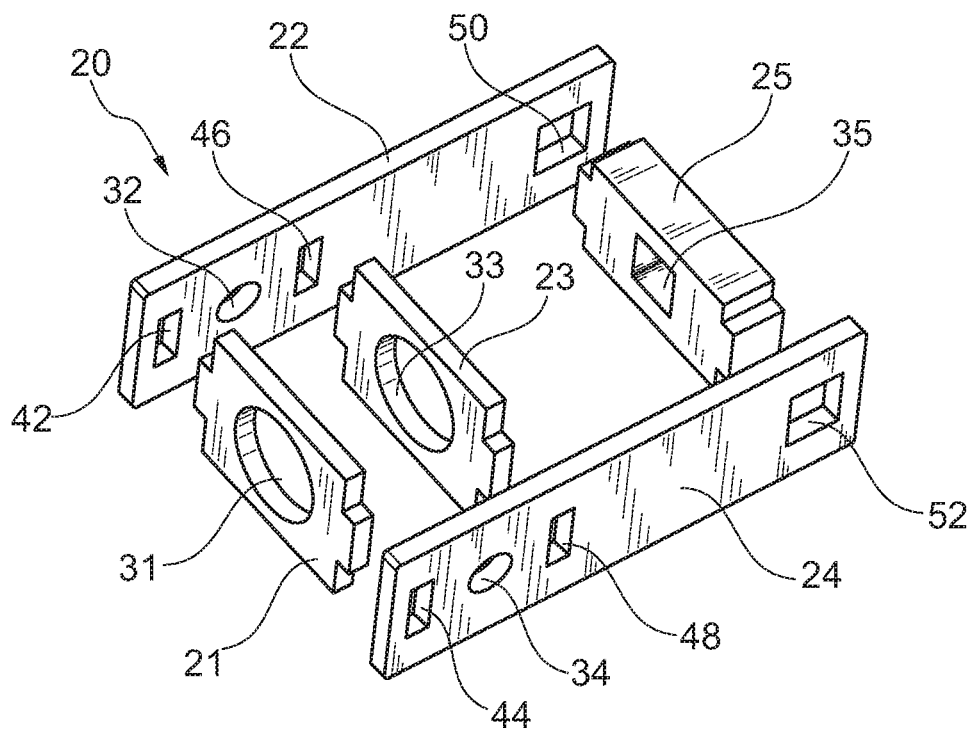
FIG. 4 is an exploded view of the present invention.

As shown in FIGS. 3 and 4 the adapter 20 is a rectangular metal shape frame comprising of symmetrical side walls and symmetrical cross bars creating a wrench end to be connected to a rotating shaft of an impact wrench and a gear shaft end to be connected to a landing gear shaft. The cross bars are connected to the side walls by a tongue and aperture connection. The adapter 20 provides a combination of one-piece device which may be welded as a single unit. Once the cross bars are installed inside the rectangular holes they may be welded. The rectangular holes size may vary depending on the thickness of the steel used for construction of the adapter 20. The adapter 20 may be constructed of any suitable type of metal, but it is preferably constructed of steel or its compounds to achieve a rigid and lightweight device. The adapter 20 may be painted/coated as powder coat or e-coat or may also be plated.

The adapter 20 has a height varying from 1 inch to 5 inches or any desired height. The length of the adapter 20 may vary from 2 inches to 20 inches or any length depending on the landing gear shaft 15 of the trailer. The adapter 20 comprises of two rectangular side walls 22 and 24 with apertures thereon. A plurality of rectangular cross bars 21, 23 and 25 is provided along the central portion of the frame each having tongue shape projecting portions on the sides to permit the cross bars to be installed within the apertures of the side walls 22 and 24.

The first cross bar 21 provided on the front side of the adapter 20 has a first circular aperture on its centre 31 with a diameter of 1-inch or any diameter corresponding to the landing gear shaft 15 to receive the landing gear shaft protruding portion 15. The second cross bar 23 in the middle further provides a second circular aperture in its centre 33 with a diameter of 1-inch depending on the landing gear shaft 15. The first aperture 31 and the second aperture 33 on the first cross bar 21 and the second cross bar (gear shaft end) are in one direction to receive and hold the landing gear shaft 15. The third cross bar (wrench-end-cross-bar) 25 in the rear portion has a square shape aperture 35.

The square shape aperture 35 is provided for connection of an electric or air driven impact wrench and may be varying at any size that an impact wrench may be. The square shape aperture 35 may be in various diameter ⅜, ⅓, ¾ or any size depending on the impact wrench used. The thickness of the third cross bar (wrench-end-cross-bar) 25 may vary from ⅛ to 1-inch. The height of the third cross bar (wrench-end-cross-bar) 25 is less than the height of the first cross bar 21 and the second cross bar 23 and provide a design to allow for a coupler of a hand-crank 18 to fit over the third cross bar (wrench-end-cross-bar) 25 and in between the set of side walls 22 and 24 in any case that an electric wrench is not available.

The side walls 22 and 24 provide a plurality of rectangular apertures to receive the cross bars. The first cross bar 21 is installed in the first set of rectangular apertures 42 and 44, the second cross bar 23 is installed in the second set of rectangular apertures 46 and 48 and the third cross bar (wrench-end-cross-bar) 25 is installed in the third set of rectangular apertures 50 and 52. The parts will be assembled to build a rectangular frame.

Figure 5A:
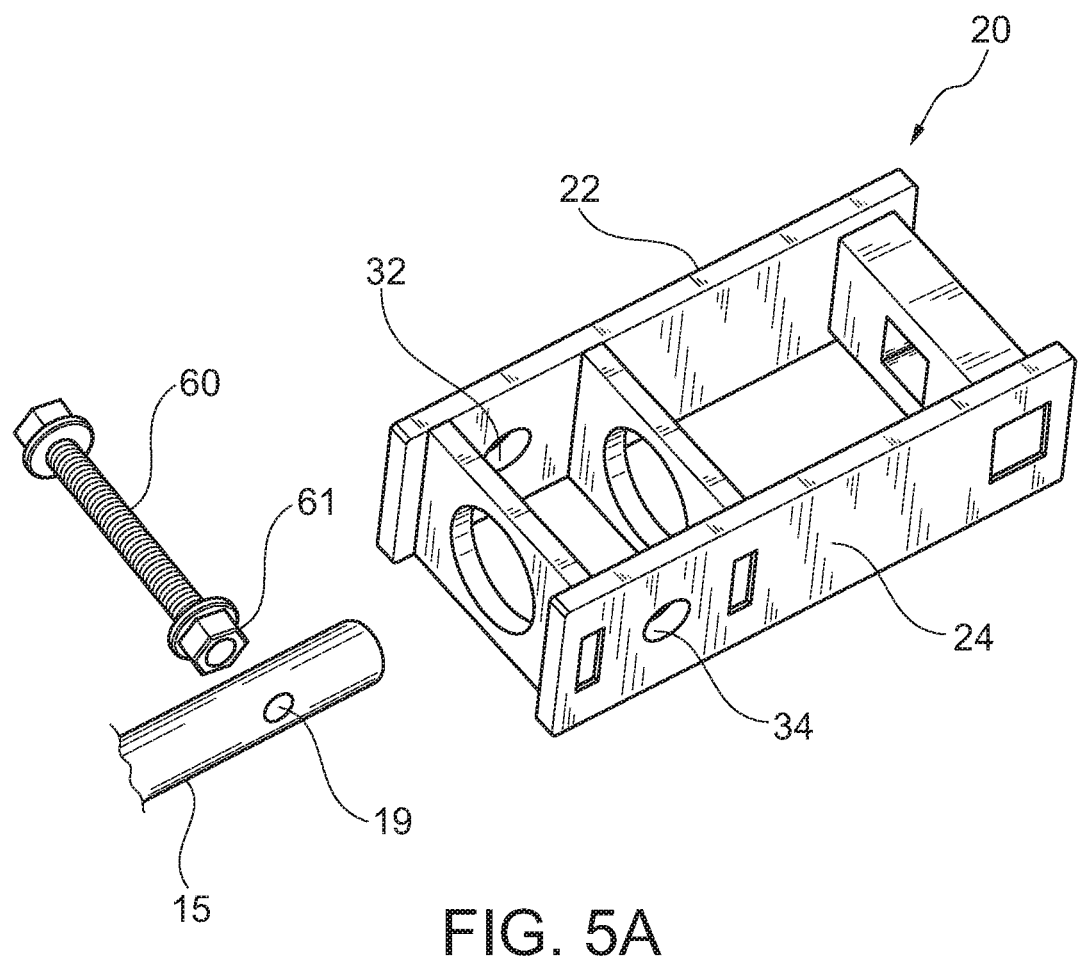
FIG. 5A shows the connection of the present invention to the landing gear shaft.
Figure 5B:
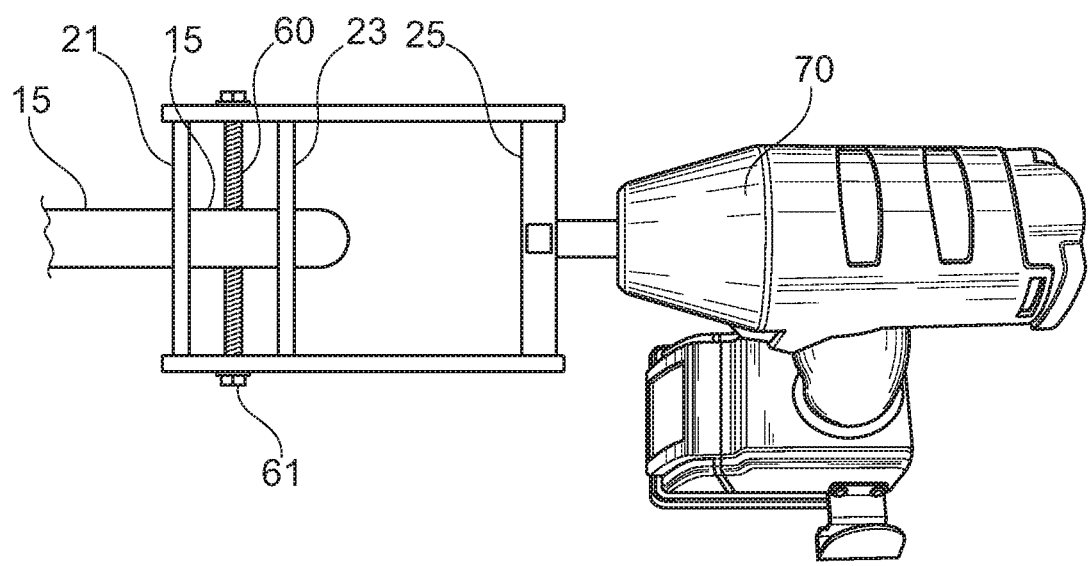
FIG. 5B shows the operation of the present invention in use with an electric wrench.

According to FIGS. 5A and 5B a locking mechanism is provided to lock the adapter 20 to the landing gear shaft 15. The side walls 22 and 24 provide a set of circular apertures 32 and 34 to receive a fastening bolt 60 and nut 61 to fixedly fasten the adapter 20 to the landing gear shaft 15. The landing gear shaft 15 provide a circular hole 19 on its protruding portion. The circular apertures on the side walls 32 and 34 and the bolt diameter 60 is ⅜-inches and may vary depending on the diameter of the landing gear shaft hole 19. The landing gear hole 19 diameter may vary from ¼ to 1 inch. The rectangular holes 42 and 44, 46 and 48, 50 and 52 size may vary depending on the thickness of the steel used in welding process. The thickness of the cross bars 21, 23 and the side walls 22 and 24 may vary from 1 to ⅛ inch.

Figure 6A:
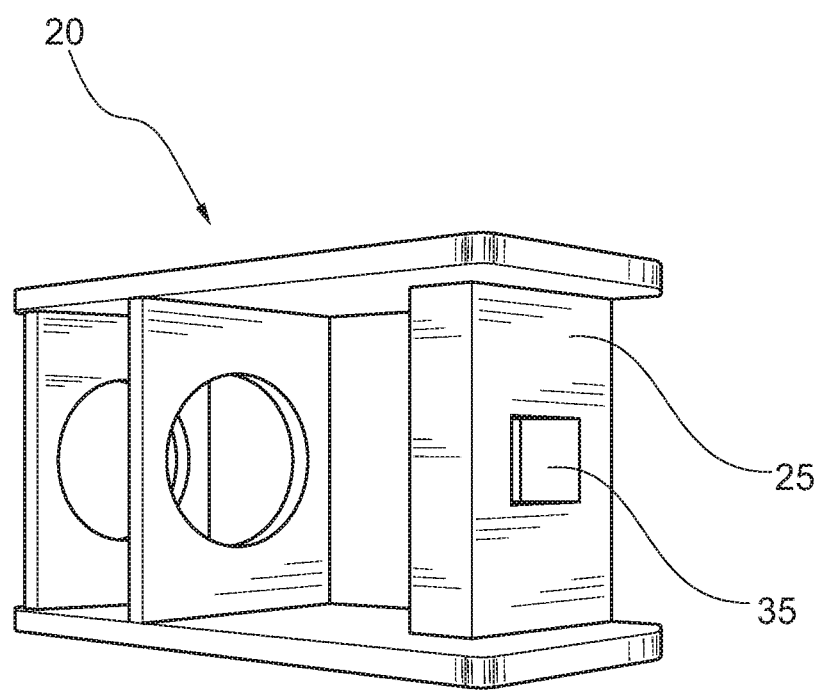
FIG. 6A is a perspective view of the present invention showing the third cross bar.
Figure 6B:
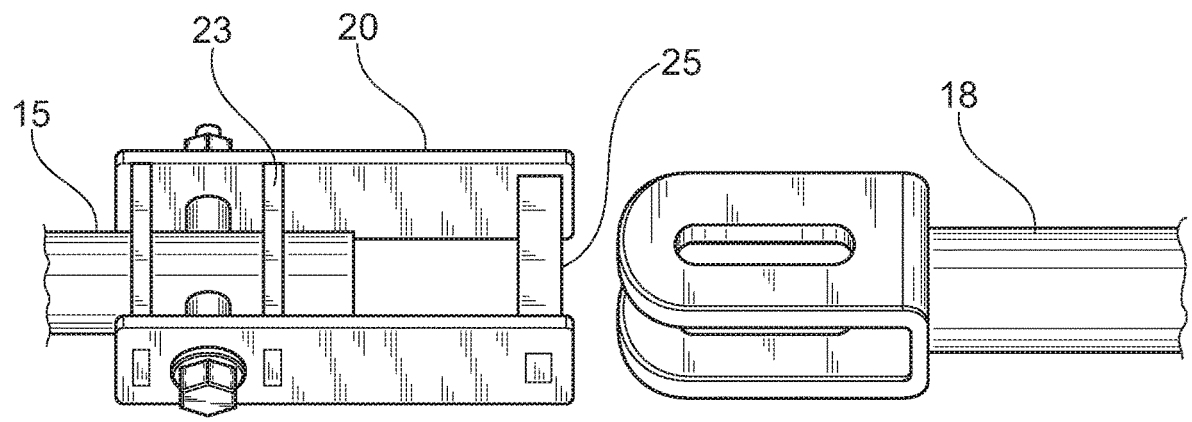
FIG. 6B shows the connection of the present invention with a hand-crank.
Figure 6C:
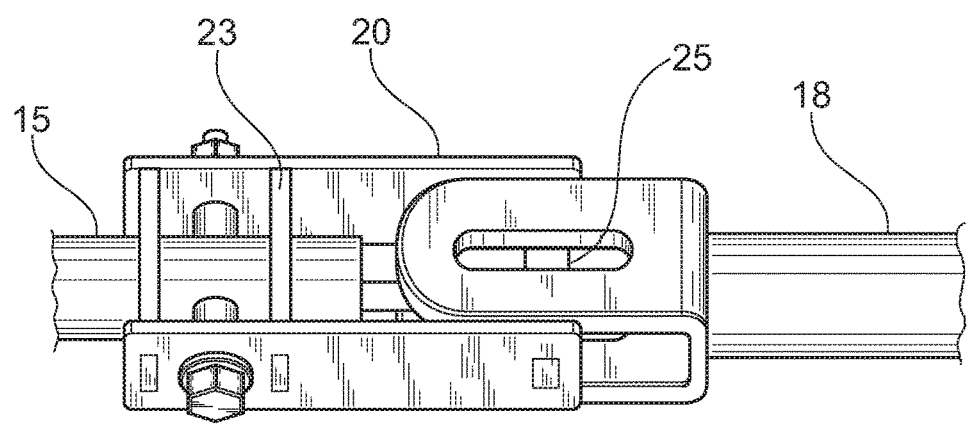
FIG. 6C shows the operation of the present invention with a hand-crank.

According to FIGS. 6A, 6B and 6C the adapter 20 provides a multi-use operation which allows to be also used with the existing hand-crank in case the driver is unable to power his/her impact wrench. The adapter 20 has a unique design to be able to operate with a hand crank which is available in every trailer. The third cross bar (wrench-end-cross-bar) 25 has a height less than the first cross bar 21 and the second cross bar 23 to allow for connection of a hand-crank coupler 18 thereon.

Figure 7A:
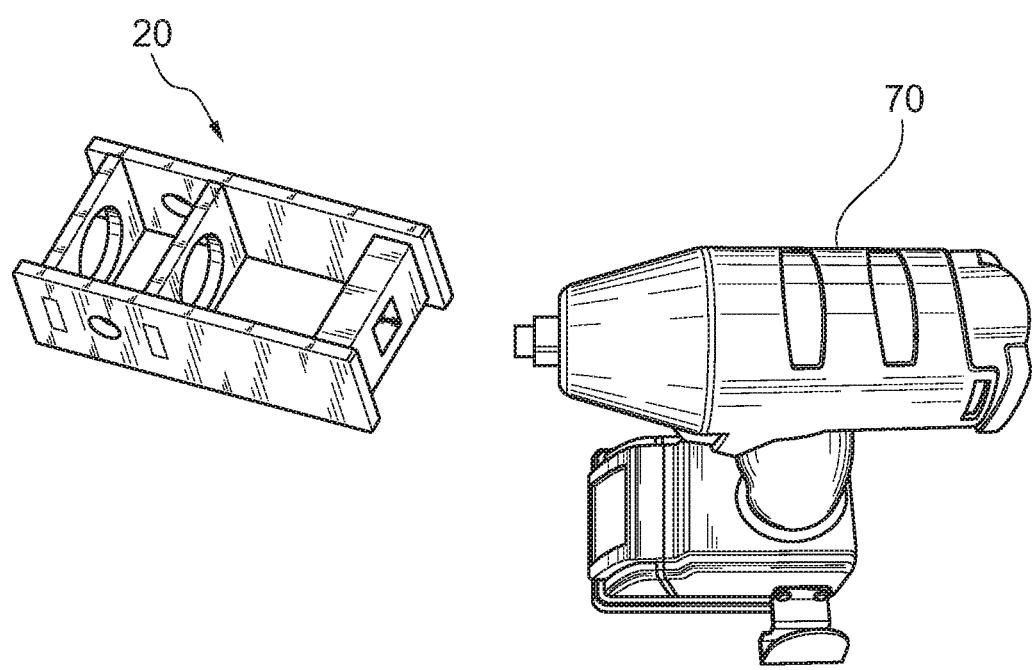
FIG. 7A shows the operation of the present invention using an electric wrench.
Figure 7B:
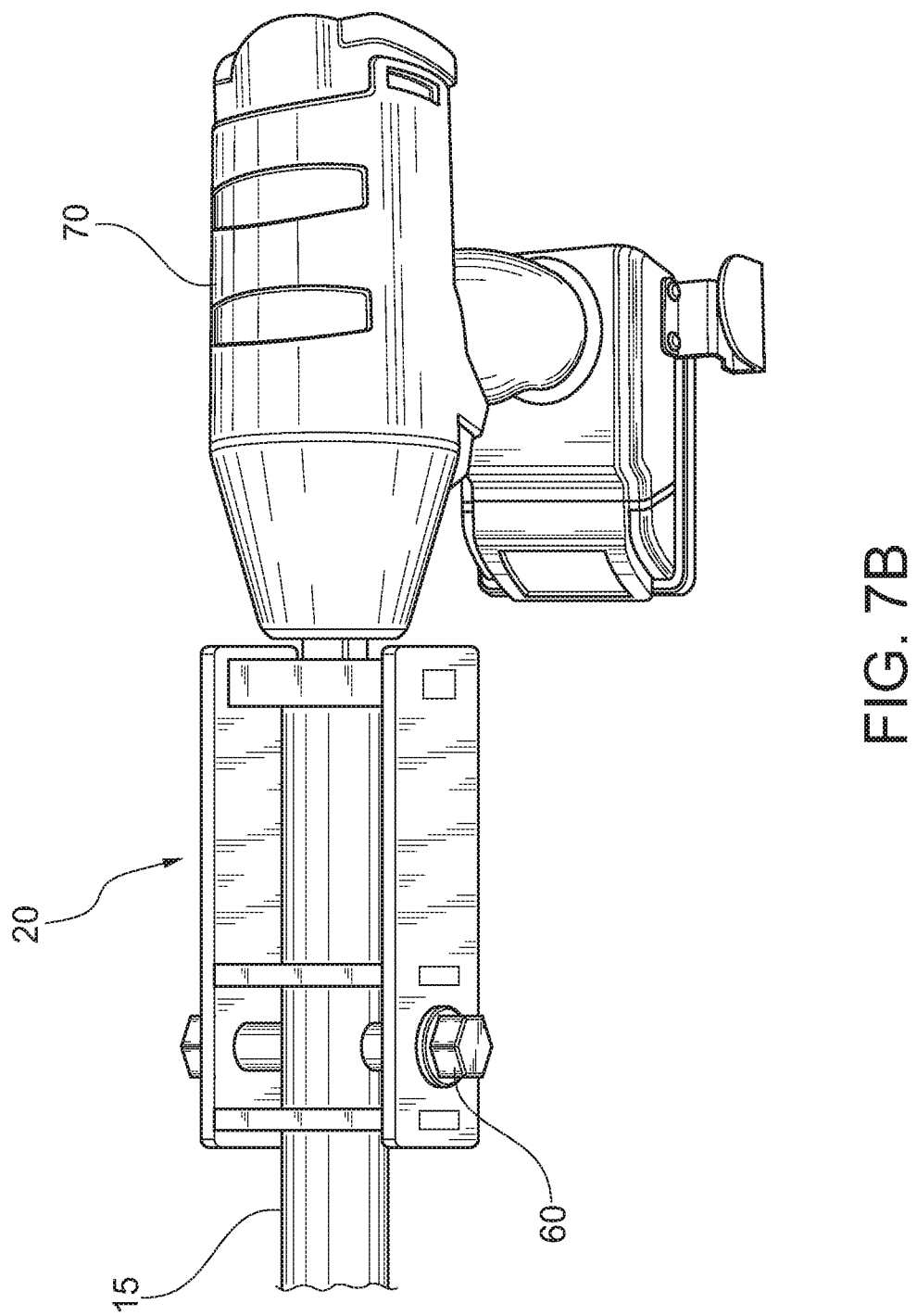
FIG. 7B shows the connection of the present invention to the landing gear shaft and the electric wrench.

FIGS. 7A and 7B show the operation of the adapter 20 connecting to an electric impact wrench 70. The adapter is inserted into the protruding portion of the landing gear shaft 15 from one end and secured thereon with a bolt 60 and nut 61 assembly. The adapter 20 co-operates with the landing gear shaft 15 to rotate the shaft 15 one way or the other to extend or retract the landing gear legs 14 and 16 by use of a rotating device such as an electric wrench 70 thereby lower or raise the landing gear 12. The operation time for raising a landing gear is less than 20 seconds.

Figure 8B:
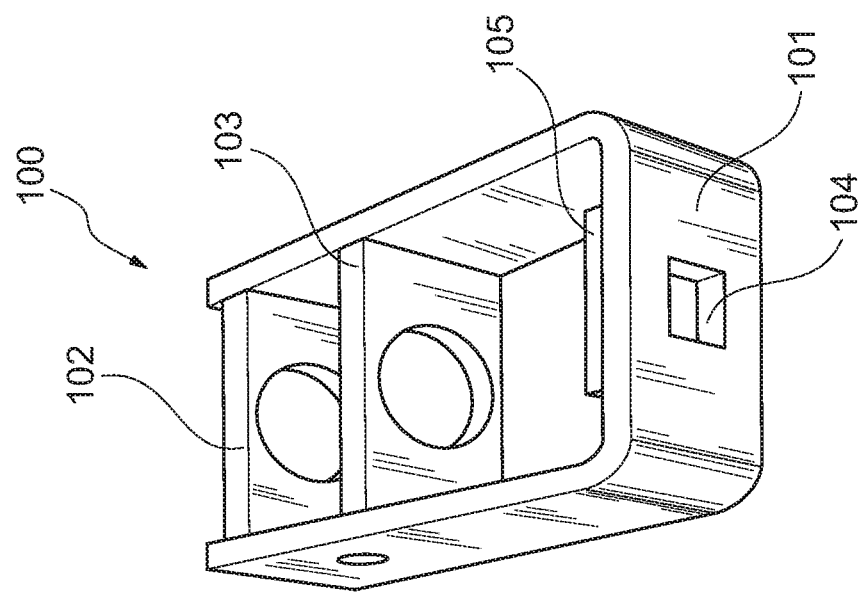
FIG. 8B is a perspective view of another embodiment of the present invention.
Figure 8A:
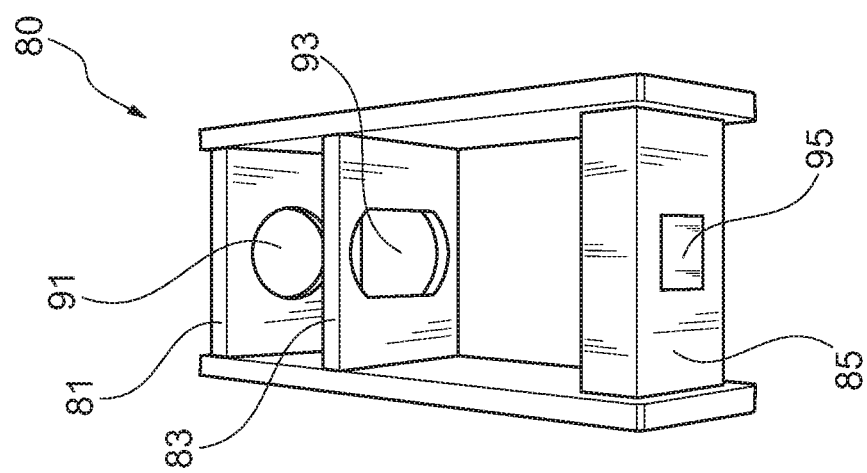
FIG. 8A is a perspective view of another embodiment of the present invention.

FIG. 8A shows another embodiment 80 of the present invention in which the first cross bar 81 has a round aperture 91 and the second cross bar 83 has a tapered aperture 93 in its central portion with a diameter of 1-inch or any diameter corresponding to the landing gear shaft. The third cross bar (wrench-end-cross-bar) 85 has a square shape aperture 95. The square shape aperture 95 may be in various diameter i.e., ⅜, ⅓, ¾ inches or any size depending on the impact wrench. The thickness of the third cross bar (wrench-end-cross-bar) 85 may vary from ⅛ to 1-inch. The height of the third cross bar (wrench-end-cross-bar) 85 is less than the first cross bar 81 and second cross bar 83 to allow for a hand-crank handle 18 to be mounted on top of the third cross bar 85.

FIG. 8B shows another embodiment 100 of the adapter. The frame is constructed in one piece so that the two rectangular side walls and the third cross bar are welded in one-piece U-shape frame 101 with rounded edges. The U-shaped frame 101 provides a square shaped aperture 104 for the use of an impact wrench. The adapter further has a first front cross bar 102 and a second cross bar 103 to strengthen the aperture 104, an independent cross 105 with the same square shaped aperture as 104 is welded behind the aperture 104.

Figure 9A:
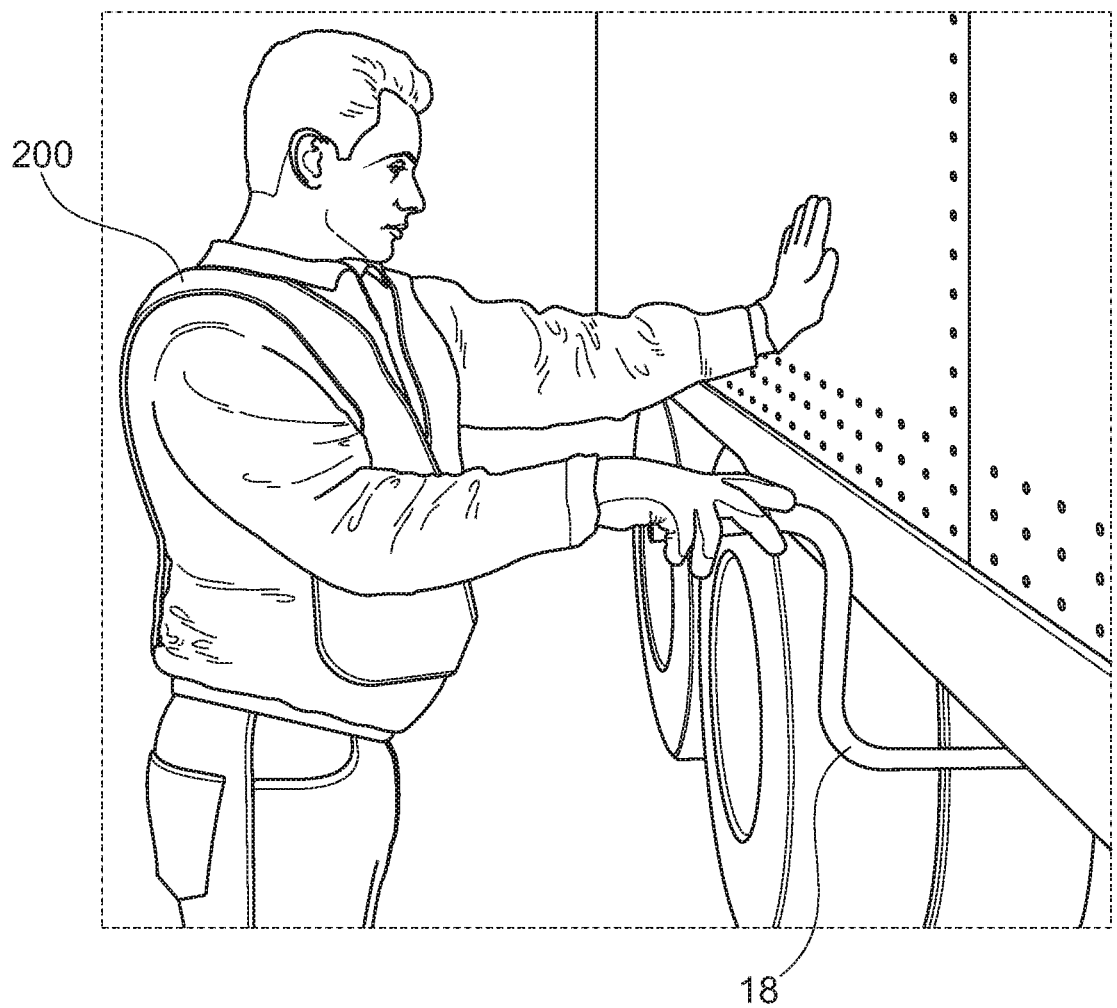
FIG. 9A shows a user manually raising and lowering the landing gear.
Figure 9B:
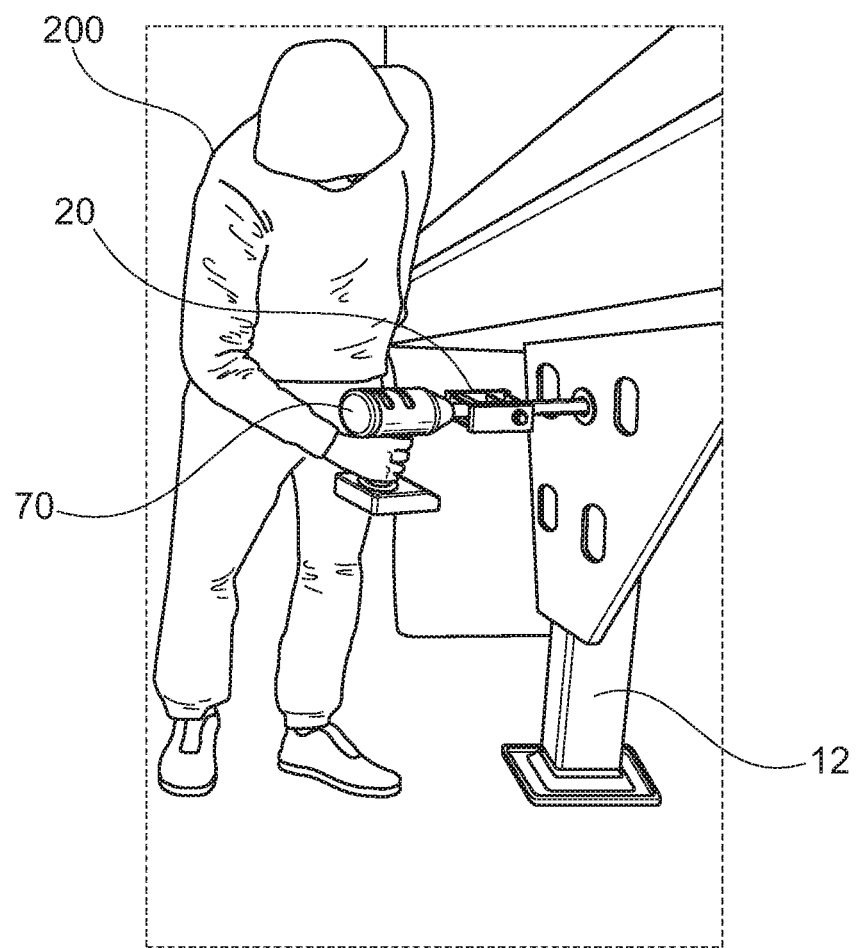
FIG. 9B shows a user using the adapter of the present invention to raise and lower a landing gear with an off-the-shelf 0.5-inch electric wrench.

FIG. 9A shows an existing landing gear system in which the user 200 uses a hand crank handle 18 to manually raise or lower the landing gear 12. This process takes about 3 to 5 minutes with tension and force on the user's hand, shoulder, back and knee. FIG. 9B shows the operation of the system in which the user 200 uses the adapter 20 of the present invention for raising and lowering a landing gear 12 with the use of an electric wrench 70.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A universal adapter attachable to a landing gear shaft for automation and electrification of raising and lowering a landing gear of a semi-truck trailer, said adapter comprising:
    a) a frame having a wrench end, a gear shaft end, and a set of side walls, wherein said frame is rectangular having a set of symmetrical side walls;
    b) the wrench end configured to interchangeably receive an impact wrench, and a hand-crank handle;
    c) the gear shaft end configured to receive a landing gear shaft, and
    d) a locking mechanism to lock the landing gear shaft in the frame.

2. The universal adapter of claim 1, wherein the gear shaft end comprising of a first cross bar having a first aperture and a second cross bar with a second aperture connecting the set of side walls, wherein the first and the second apertures are in coaxial configuration, and wherein the size and the shape of the apertures are configured to receive the landing gear shaft, whereby the landing gear shaft is inserted into the first and the second apertures and is fastened with the locking mechanism therein.

3. The universal adapter of claim 2, wherein the first cross bar and the second cross bar having a tongue and the side walls having an aperture, and whereby each tongue is inserted in each aperture and then welded to provide a strong connection and prevent breakage of the connection during operation.

4. The universal adapter of claim 2, wherein said first aperture and said second aperture have a diameter of about 1-inch corresponding to the diameter of the landing gear shaft.

5. The universal adapter of claim 3, wherein the thickness of the first cross bar, the second cross bar and the side walls are 1 to 1/16 inches depending on the thickness of the steel used in welding process.

6. The universal adapter of claim 2, wherein the first aperture and the second aperture are tapered.

\* \* \* \* \*